US009892423B2

(12) United States Patent
Kaul et al.

(10) Patent No.: US 9,892,423 B2
(45) Date of Patent: Feb. 13, 2018

(54) SYSTEMS AND METHODS FOR FRAUD DETECTION BASED ON IMAGE ANALYSIS

(71) Applicant: Facebook, Inc., Menlo Park, CA (US)

(72) Inventors: Vivek Kaul, Mountain View, CA (US); Tara Brittany Stewart, Oakland, CA (US); Utkarsh Lath, Mountain View, CA (US); Michael Francis Zolli, Austin, TX (US); Balamanohar Paluri, Menlo Park, CA (US); Nikhil Johri, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 41 days.

(21) Appl. No.: 14/666,961

(22) Filed: Mar. 24, 2015

(65) Prior Publication Data
US 2016/0283975 A1    Sep. 29, 2016

(51) Int. Cl.
G06K 5/00    (2006.01)
G06Q 30/02   (2012.01)
G06Q 50/00   (2012.01)

(52) U.S. Cl.
CPC ......... G06Q 30/0248 (2013.01); G06Q 50/01 (2013.01)

(58) Field of Classification Search
CPC .................. G06Q 30/0241; G06Q 30/0248
See application file for complete search history.

(56) References Cited

U.S. PATENT DOCUMENTS

| 2014/0214514 | A1* | 7/2014 | Rector | G06Q 30/0238 705/14.26 |
| 2014/0331119 | A1* | 11/2014 | Dixon | H04L 63/168 715/234 |
| 2015/0081415 | A1* | 3/2015 | Galinos | G06Q 30/02 705/14.25 |

* cited by examiner

Primary Examiner — Thien M Le
Assistant Examiner — April Taylor
(74) Attorney, Agent, or Firm — Sheppard Mullin Richter & Hampton LLP

(57) ABSTRACT

Systems, methods, and non-transitory computer readable media configured to receive an advertisement including an image. A fraud assessment value for the advertisement can be determined. An image assessment value for the image can be determined. The fraud assessment value and a threshold value for fraud assessment can be compared. The image assessment value and a threshold value for image assessment can be compared. Fraud associated with the advertisement can be determined based on comparison of the fraud assessment value and the threshold value for fraud assessment and comparison of the image assessment value and the threshold value for image assessment.

16 Claims, 7 Drawing Sheets

US 9,892,423 B2

SYSTEMS AND METHODS FOR FRAUD DETECTION BASED ON IMAGE ANALYSIS

FIELD OF THE INVENTION

The present technology relates to the field of image analysis. More particularly, the present technology relates to techniques for detecting fraud based on image analysis.

BACKGROUND

Today, people often utilize computing devices for a wide variety of purposes. Users can use their computing devices, for example, to communicate and otherwise interact with other users. Such interactions are increasingly popular over a social network.

Some interactions in a social network may include the sharing of content. Content can include myriad types of information. One type of content can include advertisements. The provision of advertisements can enhance the environment of a social network in various ways. For example, advertisements can encourage more participation from advertisers with a social network. As another example, advertisements can help users discover goods and services in which they may have strong interest. Advertisers and advertisements can be supportive of a social network as long as they are legitimate.

SUMMARY

Various embodiments of the present disclosure can include systems, methods, and non-transitory computer readable media configured to receive an advertisement including an image. A fraud assessment value for the advertisement can be determined. An image assessment value for the image can be determined. The fraud assessment value and a threshold value for fraud assessment can be compared. The image assessment value and a threshold value for image assessment can be compared. Fraud associated with the advertisement can be determined based on comparison of the fraud assessment value and a threshold value for fraud assessment and comparison of the image assessment value and a threshold value for image assessment.

In an embodiment, the advertisement is proposed for publication within a social networking system.

In an embodiment, the determining a fraud assessment value comprises applying a fraud classifier to the advertisement. The fraud assessment value can be determined based on the fraud classifier, the fraud assessment value indicating a probability that the advertisement is fraudulent.

In an embodiment, selectable tags corresponding to predetermined subject matter associated with fraudulent advertisements can be provided for presentation. An association of at least one tag relating to the image can be received to train an image classifier.

In an embodiment, the determining an image assessment value comprises applying an image classifier to the image. The image assessment value can be determined based on the image classifier, the image assessment value indicating a probability that the image reflects predetermined subject matter associated with fraudulent advertisements.

In an embodiment, the predetermined subject matter includes luxury goods.

In an embodiment, the image classifier is trained based on images and related tags associated with more than advertisements.

In an embodiment, the image classifier is trained on the fly based on images and related tags associated with advertisements only.

In an embodiment the images and related tags are associated by manual review.

In an embodiment, the determining fraud associated with the advertisement comprises determining whether the fraud assessment value is greater than the threshold value for fraud assessment. It can be determined whether the image assessment value is greater than the threshold value for image assessment.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
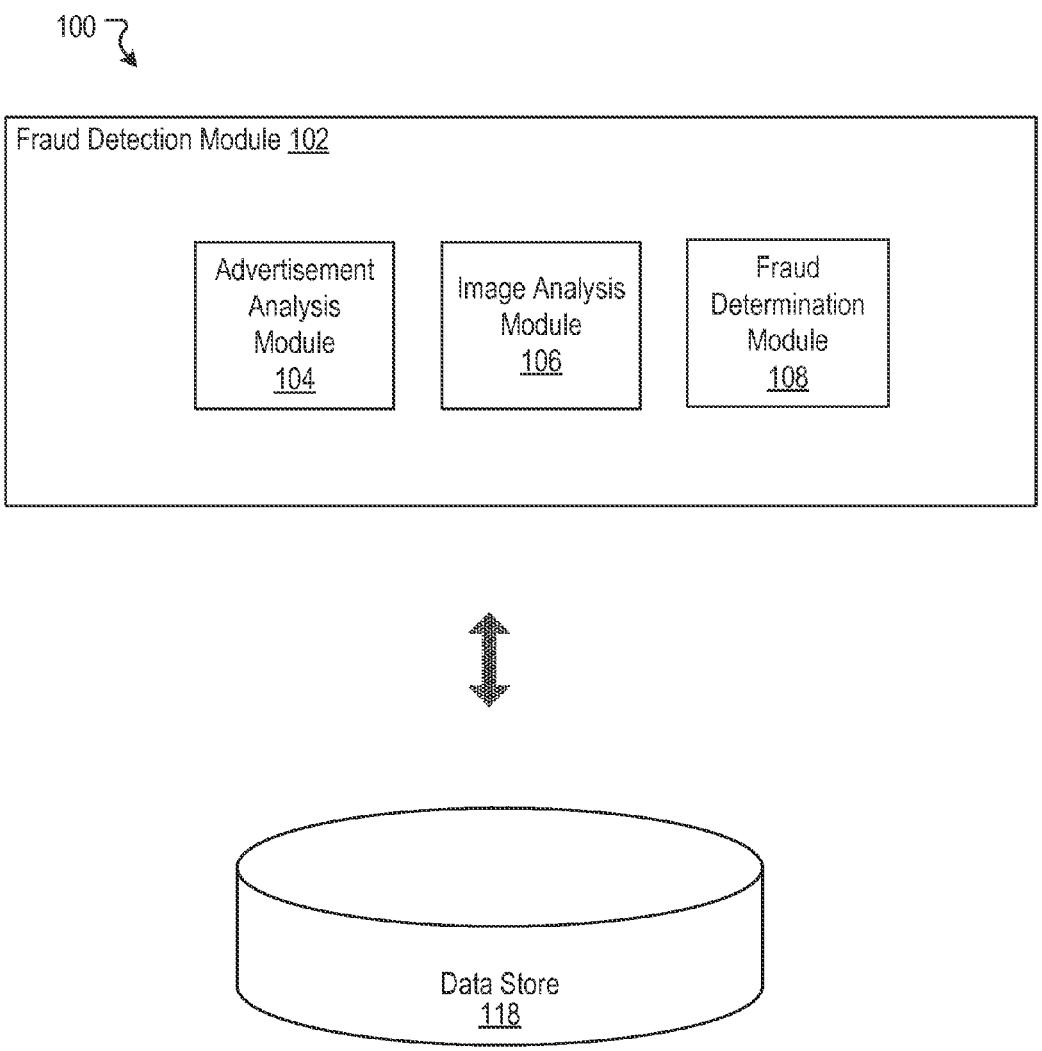
FIG. 1 illustrates a system including an example fraud detection module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Identifying Fraudulent Advertisements

The provision of advertisements can enhance the environment of a social network in various ways. For example, advertisements in general provide more useful information to a social network in which they are published. As a related matter, an advertiser can understand the potential business impact of effective advertising and therefore can be incentivized to actively engage within the social network. From the perspective of a user, advertisements published to a social network of the user can present many benefits. For example, an advertisement can help the user locate goods and services in which the user may have already expressed interest. As another example, an advertisement that is optimally targeted to the user may allow the user to explore a new interest in an offering promoted by the advertisement. Advertisements therefore can benefit both advertisers and users in a social network.

Legitimate advertisements, which can enhance a social network, should be distinguished from illegitimate advertisements. Illegitimate advertising can attempt to deceive users of a social network into clicking on or otherwise pursuing, for example, offers to sell apparently genuine, but actually counterfeit, goods at unreasonably low prices. Upon selection of such an illegitimate advertisement, a user may be directed, for example, to an unexpected website, often an online destination that bears no relationship to the advertised offering. An illegitimate advertisement sometimes can surface in a social network as part of a contemporaneous trend of illegitimate advertisements all promoting the same type of offering. Frequently, the type of offering can be a luxury item, such as a watch, sunglasses, purse, shoes, etc. An advertiser behind the illegitimate advertisement not only can deceive a user into taking unintended action but also can fail to make proper payment to an administrator of the social network for publication of the advertisement.

An improved approach to identifying and preventing the publication of illegitimate advertising in a social networking system overcomes disadvantages associated with conventional approaches. In general, systems, methods, and computer readable media of the present disclosure can analyze a proposed advertisement having an image for potential fraud. The advertising analysis can result in a fraud assessment value indicating a probability that the advertisement is fraudulent. In addition, the image in the advertisement can be analyzed to determine the subject matter reflected by the image. In particular, the image can be analyzed to determine if the image reflects predetermined subject matter (e.g., luxury goods) that is known to be associated with fraudulent advertisements. The image analysis can result in an image assessment value indicating a probability that the image in the advertisement reflects the predetermined subject matter. The fraud assessment and the image assessment can be compared to selected threshold values. When the fraud assessment value and the image assessment value satisfy the threshold values, the advertisement can be determined to be fraudulent. In some instances, tags associated with the predetermined subject matter can be available to label images in advertisements during manual review of the advertisements. When labeled with the tags, the images and associated tags can be used to train a new classifier on the fly to identify such predetermined subject matter in advertisements so that fraud can be identified and redressed.

FIG. 1 illustrates an example system 100 including an example fraud detection module 102 to allow identification of illegitimate (e.g., fraudulent) advertisements, according to an embodiment of the present disclosure. The fraud detection module 102 can analyze advertisements including images and contextual information regarding the advertisement. The advertisements can be proposed for presentation, or even already presented, to any audience or environment (e.g., users of a social networking system 630 as discussed in more detail herein).

The fraud detection module 102 can analyze advertisements based on historical occurrence (e.g., trends) of advertisements that are known by the fraud detection module 102 to be fraudulent and that include images reflecting certain subject matter. For example, a historical trend in fraudulent advertisements can include advertisements including images that reflect various types of goods or services. One type of goods or services that can be reflected by images in fraudulent advertisements is luxury goods, such as sunglasses, watches, purses, shoes, etc.

The fraud detection module 102 can perform an advertising analysis on the advertisement to generate a fraud assessment value indicating a probability that the advertisement is fraudulent based on various attributes of the advertisement. In addition, the fraud detection module 102 can perform an image analysis on an image of the advertisement to determine whether the image reflects predetermined subject matter (e.g., luxury goods) that is known by the fraud detection module 102 to be associated with fraudulent advertisements. From the image analysis, the fraud detection module 102 can generate an image assessment value indicating a probability that the image in the advertisement reflects the predetermined subject matter. The fraud assessment value and the image assessment value can be compared to selected threshold values. When the fraud assessment value and the image assessment value satisfy the threshold values, the advertisement can be determined to be fraudulent and accordingly certain remedial action can be taken against the fraudulent advertisement.

In some instances, the fraud detection module 102 can make available to a fraud analyst selectable tags associated with the predetermined subject matter to label images in advertisements during manual review of the advertisements. When the fraud analyst determines that an image reflects the predetermined subject matter, the fraud analyst can select a tag corresponding to the predetermined subject matter to be associated with the image. Images and associated tags can be used on the fly to train and retrain a new classifier to identify such predetermined subject matter in advertisements so that fraud can be identified and redressed.

The fraud detection module 102 can include an advertisement analysis module 104, an image analysis module 106, and a fraud determination module 108. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the fraud detection module 102 can be implemented in any suitable combinations.

In some embodiments, the fraud detection module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the fraud detection module 102 can be implemented, in part or in whole, as software running on one or more computing devices or systems, such as on a server or client computing device. For example, the fraud detection module 102 can be implemented as or within a dedicated application (e.g., app), a program, or an applet running on a user computing device or client computing system. In some instances, the fraud detection module 102 can, in part or in whole, be implemented within or configured to operate in conjunction or be integrated with a social networking system (or service), such as the social networking system 630 of FIG. 6. It should be understood that many variations are possible.

The advertisement analysis module 104 can perform an advertising analysis on an advertisement including an image. The advertisement analysis module 104 can develop or apply a machine learning model (fraud classifier) to the advertisement and related contextual information to determine a probability regarding whether the advertisement is fraudulent. In particular, based on the application of the fraud classifier to the advertisement, the advertisement analysis module 104 can generate a fraud assessment value regarding a probability that the advertisement is fraudulent. The advertisement analysis module 104 is described in more detail herein.

The image analysis module 106 can perform an image analysis on an image in an advertisement. The image analysis module 106 can develop or apply a machine learning model (image classifier) to the image to determine the subject matter reflected by the image. In particular, the image analysis module 106 can determine whether the image reflects predetermined subject matter (e.g., luxury goods) that is known by the fraud detection module 102 to be associated with fraudulent advertisements. The image analysis module 106 is described in more detail herein.

The fraud determination module 108 can apply threshold (selected) values to a fraud assessment and an image assessment associated with an advertisement. The fraud determination module 108 can receive a fraud assessment value from the advertisement analysis module 104. The fraud determination module 108 can receive an image assessment value from the image analysis module 106. The fraud determination module 108 can receive a threshold (selected) value for a fraud assessment (e.g., 0.01, 0.03, 0.15, etc.) and a threshold (selected) value for an image assessment (e.g., 0.5, 0.6, 0.95, etc.) from a fraud analyst (e.g., administrator of a social networking system). Any suitable threshold value for a fraud assessment can be used and any suitable threshold value for an image assessment can be used.

The fraud detection module 108 can compare the threshold value for a fraud assessment and the threshold value for an image assessment to, respectively, the fraud assessment value and the image assessment value determined for an advertisement to determine whether the advertisement is considered fraudulent. For example, when a fraud assessment value of an advertisement is greater than a threshold value for a fraud assessment and when an image assessment value of an image in the advertisement is greater than a threshold value for an image assessment, then the advertisement can be considered fraudulent. Upon a determination that an advertisement is fraudulent, the advertisement can be queued for further manual review or can be blocked or removed from (initial or further) publication.

In some embodiments, the threshold value for a fraud assessment and the threshold value for an image assessment can be determined or modified by a fraud analyst based on manual review of advertisements. For example, the fraud analyst can inspect and interact with advertisements and conclude whether or not the advertisements are fraudulent. Further to this example, the fraud analyst can compare her conclusions with the fraud assessment values for the advertisements determined by the advertisement analysis module 104. In this regard, the comparison can result in a determination by the fraud analyst that satisfaction of a certain threshold value for fraud assessments accurately indicates the existence of a fraudulent advertisement. The threshold value can be used by the fraud detection module 102 as the threshold value for a fraud assessment. In some embodiments, the threshold value for a fraud assessment can be in the same range as possible fraud assessment values. For example, the threshold value for a fraud assessment can be a value between a range of 0 and 1.

In some embodiments, the threshold value for an image assessment can be determined or modified by a fraud analyst based on manual review of advertisements in a similar manner. For example, the fraud analyst can inspect images in advertisements and conclude whether or not the images reflect predetermined subject matter known to be associated with fraudulent advertisements. Further to this example, the fraud analyst can compare her conclusions with the image assessment values for the images determined by the image analysis module 106. In this regard, the comparison can result in a determination by the fraud analyst that satisfaction of a certain threshold value for image assessments accurately indicates the existence of the predetermined subject matter. The threshold value can be used by the fraud detection module 102 as the threshold value for an image assessment. In some embodiments, the threshold value for an image assessment can be in the same range as possible image assessment values. For example, the threshold value for an image assessment can be a value between a range of 0 and 1.

In some embodiments, the threshold value for a fraud assessment can be a different from the threshold value for an image assessment. In some embodiments, a threshold value for a fraud assessment and a threshold value for an image assessment to queue an advertisement for manual review can be different from a threshold value for a fraud assessment and a threshold value for an image assessment to block an advertisement from publication. In some embodiments, the threshold value for a fraud assessment and the threshold value for an image assessment can be determined or improved by machine learning techniques.

The data store 118 can be configured to store and maintain various types of data, such as the data relating to the identification of fraudulent advertisements. The data can include data relating to, for example, identification of predetermined subject matter reflected by images known to be associated with fraudulent advertising, advertisements proposed for publication, images in the advertisements, tags corresponding to predetermined subject matter reflected by images known to be associated with fraudulent advertising, features to develop machine learning models to determine a probability that an advertisement is fraudulent, features to develop machine learning models to determine a probability that an image reflects predetermined subject matter known to be associated with fraudulent advertisements, threshold values for fraud assessment, threshold values for image assessment, determinations of fraudulent advertisements, etc. The data store 118 can also maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the fraud detection module 102 can be configured to communicate and/or operate with the data store 118.

Figure 2:
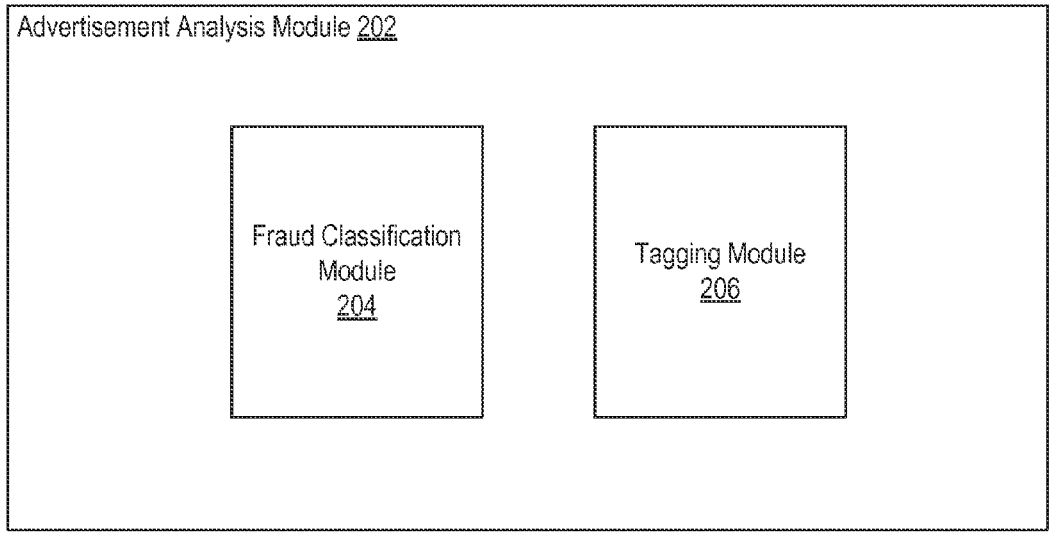
FIG. 2 illustrates an example advertisement analysis module, according to an embodiment of the present disclosure.

FIG. 2 illustrates an example advertisement analysis module 202, according to an embodiment of the present disclosure. In some embodiments, the advertisement analysis module 104 of FIG. 1 can be implemented with advertisement analysis module 202. As shown in the example of FIG. 2, the advertisement analysis module 202 can include a fraud classification module 204 and a tagging module 206.

The fraud classification module 204 can apply a machine learning model (fraud classifier) to an advertisement and related contextual information to determine a probability regarding whether the advertisement is fraudulent. The fraud classifier can be based on any machine learning technique, including but not limited to a gradient boosting technique. The fraud classifier can be developed based on a variety of features associated with an advertisement and its contextual information. The contextual information can vary according to the circumstances under which the advertisement is proposed for publication. For example, in the context of a social networking system, such features can relate to an age of an account with the social networking system of an advertiser, an IP address of a computing system used by the advertiser to interact with the social networking system, a ratio between a number of disabled accounts with the social networking system in a geographic region associated with the advertiser and a total number of account for that region, and many other considerations.

Based on the application of the fraud classifier to the advertisement, the fraud classification module 204 can generate a fraud assessment value indicating a probability that the advertisement is fraudulent. For example, the fraud assessment value can be a value in a range between 0 and 1, where a value of 1 reflects a highest probability that the advertisement is fraudulent and a value of 0 reflects a lowest probability that the advertisement is fraudulent. The fraud assessment value can be provided to the fraud determination module 108.

In some embodiments, attributes of the image in the advertisement are not used as features for the machine learning model (fraud classifier) to generate a fraud assessment value. However, in other embodiments, attributes of the image in the advertisement can be used as features for the machine learning model to generate a fraud assessment value. In this regard, the fraud detection module 102 can receive images in advertisements and associated tags reflecting predetermined subject matter know to be associated with fraud to train the machine learning model supported by the fraud classification module 204.

The tagging module 206 can associate tags with images in advertisements based on subject matter reflected in the images. The fraud detection module 102 can maintain information regarding predetermined subject matter reflected by images known to be associated with fraudulent advertisements. For example, such subject matter can include certain types of goods or services, such as luxury goods. The tagging module 206 can present selectable tags in an interface provided to a fraud analyst during manual review of an advertisement. The selectable tags can include tags that correspond to the predetermined subject matter. When the fraud analyst determines that an image reflects certain subject matter, including the predetermined subject matter, a tag corresponding to the subject matter can be selected for association with the image. Different tags can be appropriately selected to distinguish the predetermined subject matter from other subject matter reflected by the images. As discussed in more detail herein, images and tags associated during a manual review process in this manner can be used to train, retrain, and test an image classifier capable of accurately identifying such predetermined subject matter reflected by images in new advertisements so that fraudulent advertisements can be accurately identified.

Figure 3:
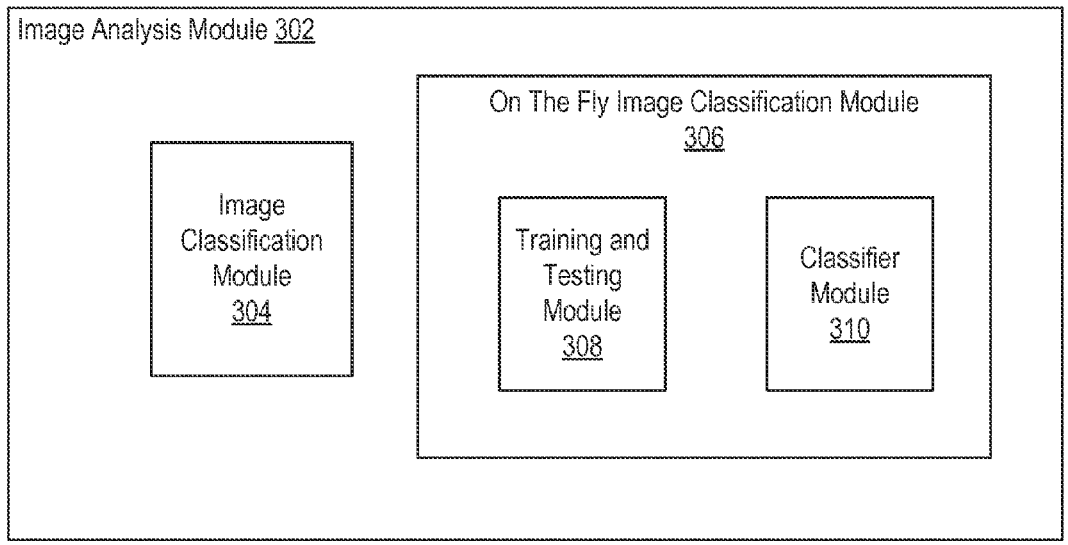
FIG. 3 illustrates an example image analysis module, according to an embodiment of the present disclosure.

FIG. 3 illustrates an example image analysis module 302, according to an embodiment of the present disclosure. In some embodiments, the image analysis module 106 of FIG. 1 can be implemented with the image analysis module 302. As shown in the example of FIG. 3, the image analysis module 302 can include an image classification module 304 and an on the fly image classification module 306 including a testing and training module 308 and a classifier module 310.

The image classification module 304 can perform a classification analysis on images in advertisements to determine the subject matter reflected by the images. The image classification module 304 can perform the classification analysis by applying a machine learning model (image classifier) to an image. In particular, the image classification module 304 can determine a probability regarding whether the image reflects predetermined subject matter known to be associated with fraudulent advertisements. The image classifier can be based on any machine learning technique, including but not limited to a deep convolutional neural network.

The image classifier supported by the image classification module 304 can be trained and tested to determine the subject matter reflected by an image. In a development phase, contextual cues for a sample set of images can be gathered. Images classes corresponding to various subject matter can be determined. Correlation of the sample set of images with the image classes based on the contextual cues can be determined. A training set of images can be generated from the sample set of images based on scores indicative of high correlation. The training set of images can be used to train the image classifier to generate visual pattern templates of the image classes. In an evaluation phase, the image classifier can be applied to a new image in an advertisement to determine whether the image reflects predetermined subject matter known to be associated with fraud.

In some embodiments, the image classifier supported by the image classification module 304 can be trained to identify a wide array of subject matter, including but not limited to counterfeit goods potentially depicted in advertisements. The training set of images can include depictions of genuine goods and depictions of counterfeit goods along with associated tags for each type of goods. For example, the training set of images can reflect genuine goods displaying authenticating features (e.g., real logos) typical of genuine goods and can reflect counterfeit goods displaying inauthentic features (e.g., fake logos) typical of counterfeit goods. Based on the training set of images, the image classifier can be trained and tested to identify counterfeit goods and distinguish them from authentic goods. The appearance of counterfeit goods in an advertisement, like the appearance of predetermined subject matter in images known to be associated with fraudulent advertisements, can indicate that the advertisement is fraudulent.

Based on the image classifier supported by the image classification module 304, an image in a new advertisement can be analyzed to determine its subject matter. The image classification module 304 can generate an image assessment value indicating a probability that the image in the new advertisement reflects predetermined subject matter known to be associated with fraudulent advertisements. In an embodiment, the image assessment value can be a value in a range between 0 and 1, where a value of 1 can indicate a highest level of probability that the image reflects the predetermined subject matter and a value of 0 can indicate a lowest level of probability that the image reflects the predetermined subject matter. The image assessment value for the image can be provided to the fraud determination module 108.

In some embodiments, the image classifier used by the image classification module 304 can be developed and maintained by a social networking system. The image classifier can be trained based on a predetermined set of training images selected to allow the image classifier to identify a broad range of subject matter. The social networking system may use the image classifier to determine the subject matter reflected by images for all functions performed by the social networking system, including but not limited to the functions performed by the fraud detection module 102.

The on the fly image classification module 306 can develop and support an image classifier based on images in advertisements analyzed for potential fraud. In contrast to the image classifier developed by the fraud classification module 204, the image classifier supported by the on the fly classification module 306 can be an image classifier based only on images in advertisements analyzed for potential fraud and dedicated to determining subject matter reflected by such images. The on the fly image classification module 306 can support a more focused and efficient technique to identify fraudulent advertisements. In some embodiments, the fraud detection module 102 can use the image classifier supported by the on the fly classification module 306 in addition to the image classifier supported by the image classification module 304. In other embodiments, the fraud detection module 102 can use the image classifier supported by the on the fly classification module 306 as an alternative to the image classifier supported by the image classification module 304.

The training and testing module 308 of the on the fly image classification module 306 can receive images and associated tags reflecting predetermined subject matter known to be associated with fraudulent advertisements. The training and testing module 308 of the on the fly image classification module 306 also can receive images and associated tags not reflecting predetermined subject matter known to be associated with fraudulent advertisements. In addition, the images and tags can reflect goods known to be genuine and goods known to be counterfeit, as described herein. In an embodiment, the images and associated tags can be determined through human review by a fraud analyst, as described in connection with the tagging module 206. The images and associated tags can be used to train and test an image classifier on the fly to identify images that reflect the predetermined subject matter. The images and associated tags determined by a fraud analyst further can be used to periodically or continuously retrain the image classifier. Such retraining may be useful in a variety of circumstances. For example, the retraining of the image classifier can improve the accurate identification of subject matter reflected by images associated with fraud that may have previously escaped accurate identification or other rules to identify fraud. Retraining of the image classifier in the manner can make the image classifier more robust to periodic changes to the definition of the concept.

The classifier module 310 of the on the fly image classification module 306 can classify subject matter reflected by images in new advertisements. Based on the image classifier developed by the training and testing module 308, an image in a new advertisement can be analyzed to determine its subject matter. The classifier module 310 can generate an image assessment value indicating a probability that the image in the new advertisement reflects predetermined subject matter known to be associated with fraudulent advertisements. In an embodiment, the image assessment value can be a value in a range between 0 and 1, where a value of 1 can indicate a highest level of probability that the image reflects the predetermined subject matter and a value of 0 can indicate a lowest level of probability that the image reflects the predetermined subject matter. The image assessment value for the image can be provided to the fraud determination module 108.

Figure 4:
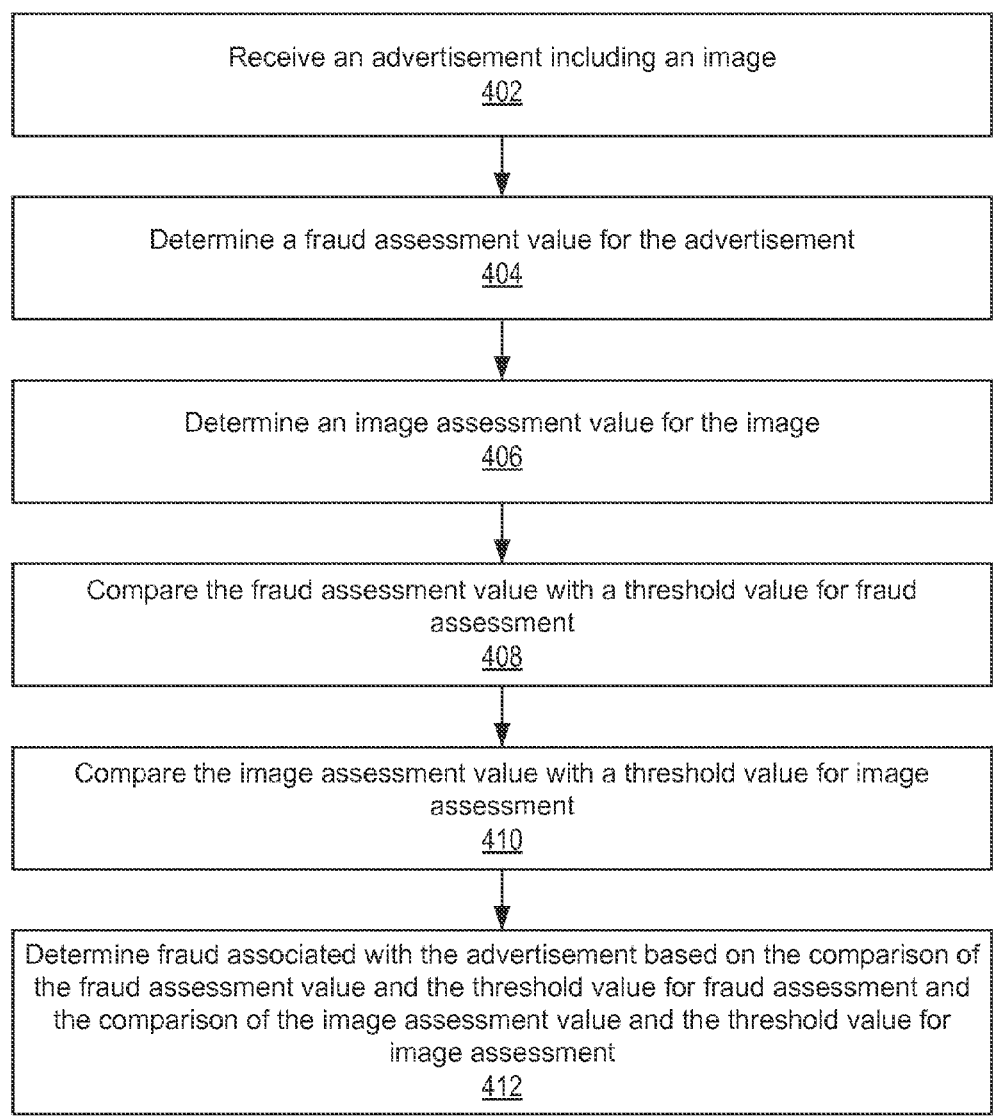
FIG. 4 illustrates an example method to determine a fraudulent advertisement, according to an embodiment of the present disclosure.

FIG. 4 illustrates an example method 400 to identify a fraudulent advertisement, according to an embodiment of the present disclosure. It should be appreciated that there can be additional, fewer, or alternative steps performed in similar or alternative orders, or in parallel, within the scope of the various embodiments unless otherwise stated.

At block 402, the method 400 can receive an advertisement including an image. At block 404, the method 400 can determine a fraud assessment value for the advertisement. At block 406, the method 400 can determine an image assessment value for the image. At block 408, the method 400 can compare the fraud assessment value with a threshold value for fraud assessment. At block 410, the method 400 can compare the image assessment value with a threshold value for image assessment. At block 412, the method 400 can determine fraud associated with the advertisement based on the comparison of the fraud assessment value and the threshold value for fraud assessment and the comparison of the image assessment value and the threshold value for image assessment. Other suitable techniques that incorporate various features and embodiments of the present technology are possible.

Figure 5:
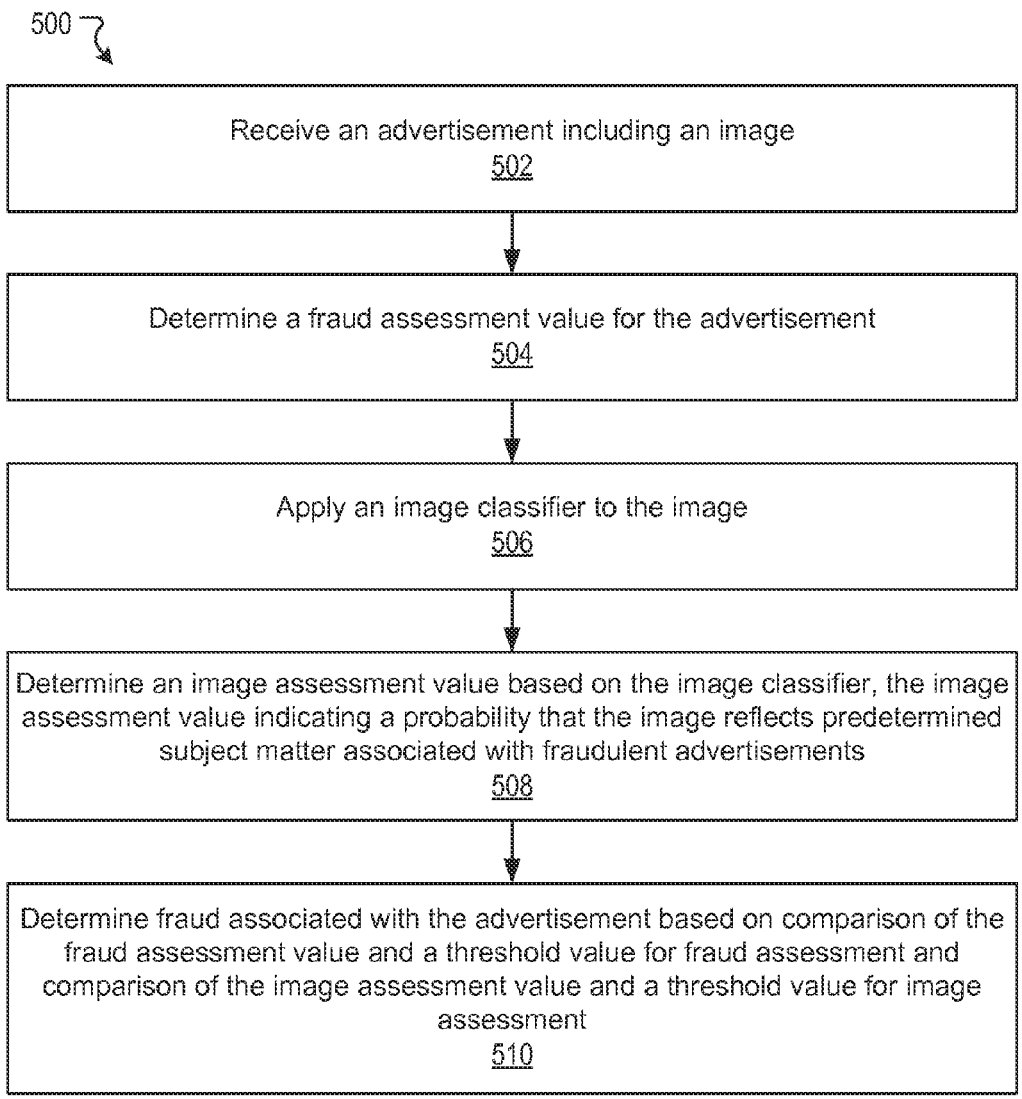
FIG. 5 illustrates an example method to determine a fraudulent advertisement, according to an embodiment of the present disclosure.

FIG. 5 illustrates an example method 500 to identify a fraudulent advertisement, according to an embodiment of the present disclosure. It should be appreciated that there can be additional, fewer, or alternative steps performed in similar or alternative orders, or in parallel, within the scope of the various embodiments unless otherwise stated.

At block 502, the method 500 can receive an advertisement including an image. At block 504, the method 500 can determine a fraud assessment value for the advertisement. At block 506, the method 500 can apply an image classifier to the image. At block 508, the method 500 can determine an image assessment value based on the image classifier, the image assessment value indicating a probability that the image reflects predetermined subject matter associated with fraudulent advertisements. At block 510, the method 500 can determine fraud associated with the advertisement based on comparison of the fraud assessment value and a threshold value for fraud assessment and comparison of the image assessment value and a threshold value for image assessment. Other suitable techniques that incorporate various features and embodiments of the present technology are possible.

Social Networking System—Example Implementation

Figure 6:
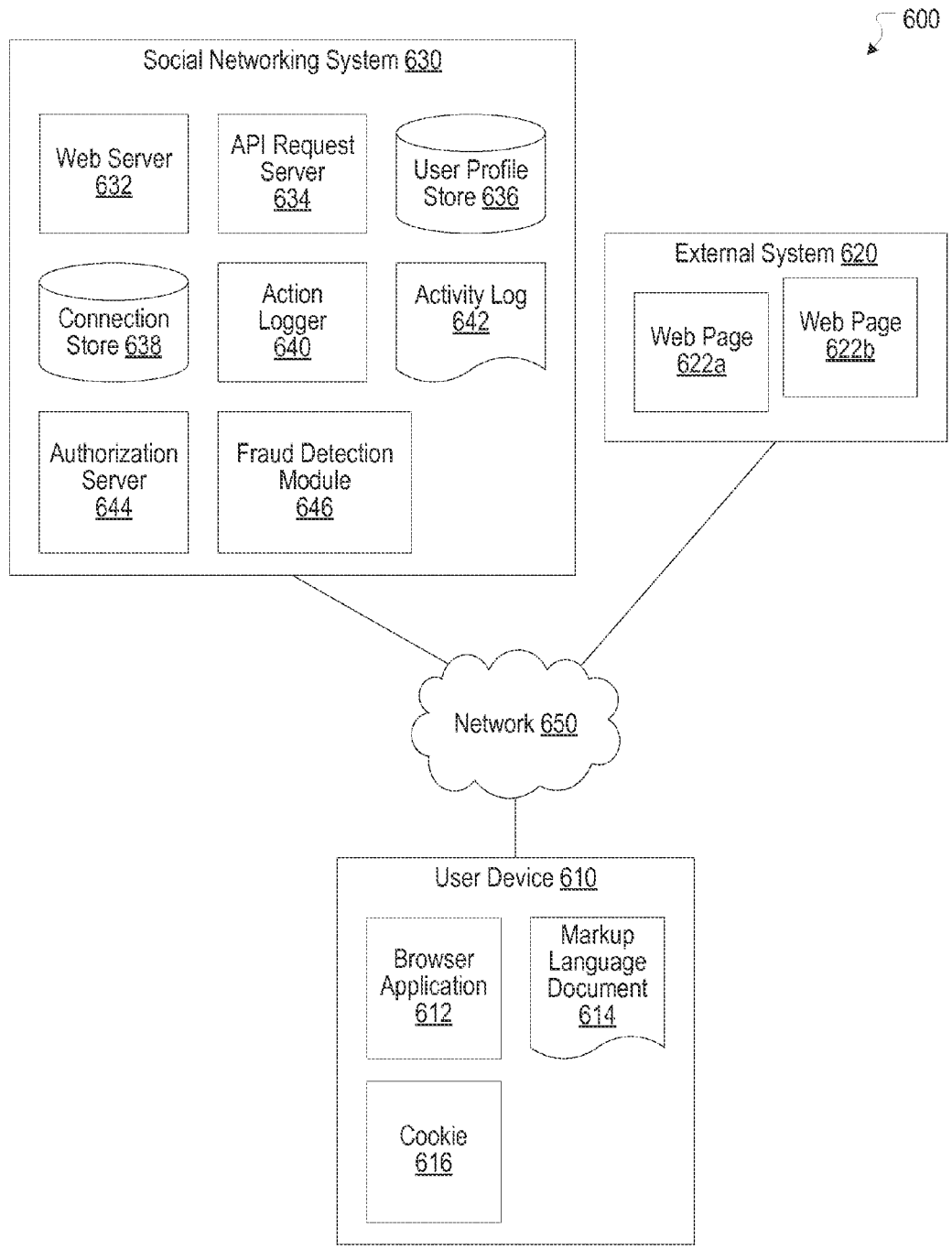
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a fraud detection module 646. The fraud detection module 646 can be implemented with the fraud detection module 102.

Hardware Implementation

Figure 7:
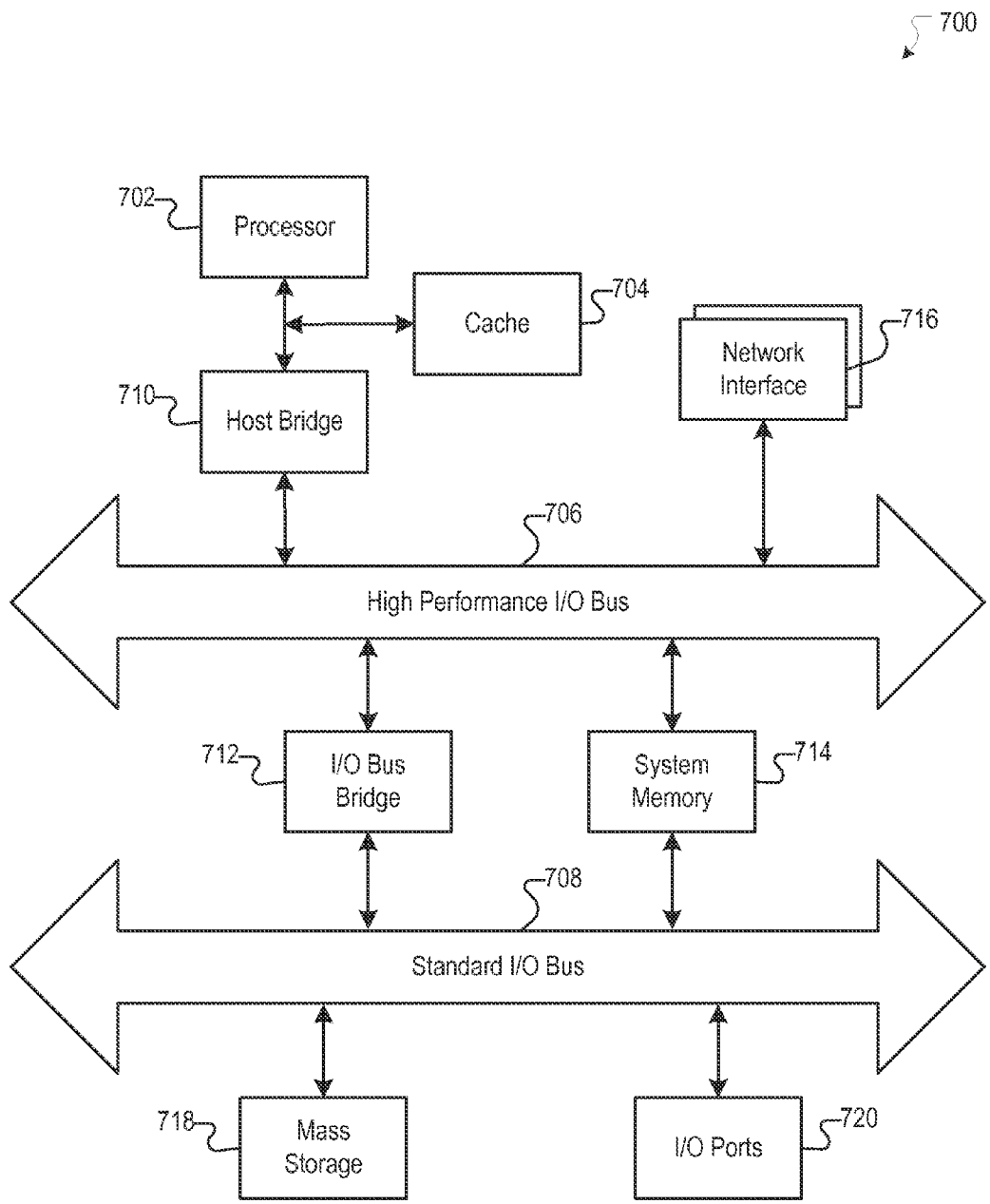
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    receiving, by a computing system, an advertisement including an image;
    training, by the computing system, a machine learning model as a fraud classifier;
    applying, by the computing system, the fraud classifier to the advertisement to generate a fraud assessment value for the advertisement;
    training, by the computing system, a machine learning model as an image classifier;
    applying, by the computing system, the image classifier to the image to generate an image assessment value for the image indicating a probability that the image reflects predetermined subject matter associated with fraudulent advertisements;
    comparing, by the computing system, the fraud assessment value and a threshold value for fraud assessment;
    comparing, by the computing system, the image assessment value and a threshold value for image assessment; and
    determining, by the computing system, fraud associated with the advertisement based on the comparing the fraud assessment value and the comparing the image assessment value, wherein the determining fraud comprises:
        determining whether the fraud assessment value satisfies the threshold value for fraud assessment; and
        determining whether the image assessment value satisfies the threshold value for image assessment.

2. The computer-implemented method of claim 1, wherein the advertisement is proposed for publication within a social networking system.

3. The computer-implemented method of claim 1, wherein
the fraud assessment value indicates a probability that the advertisement is fraudulent.

4. The computer-implemented method of claim 1, further comprising:
providing for presentation selectable tags corresponding to predetermined subject matter associated with fraudulent advertisements; and
receiving an association of at least one tag relating to the image to train the image classifier.

5. The computer-implemented method of claim 1, wherein the predetermined subject matter includes luxury goods.

6. The computer-implemented method of claim 1, wherein the image classifier is trained based on images and related tags associated with more than advertisements.

7. The computer-implemented method of claim 1, wherein the image classifier is trained on the fly based on images and related tags associated with advertisements only.

8. The computer-implemented method of claim 7, wherein the images and related tags are associated by manual review.

9. A system comprising:
at least one processor; and
a memory storing instructions that, when executed by the at least one processor, cause the system to perform:
receiving an advertisement including an image;
training a machine learning model as a fraud classifier;
applying the fraud classifier to the advertisement to generate a fraud assessment value for the advertisement;
training a machine learning model as an image classifier;
applying the image classifier to the image to generate an image assessment value for the image indicating a probability that the image reflects predetermined subject matter associated with fraudulent advertisements;
comparing the fraud assessment value and a threshold value for fraud assessment;
comparing the image assessment value and a threshold value for image assessment; and
determining fraud associated with the advertisement based on the comparing the fraud assessment value and the comparing the image assessment value, wherein the determining fraud comprises:
determining whether the fraud assessment value satisfies the threshold value for fraud assessment; and
determining whether the image assessment value satisfies the threshold value for image assessment.

10. The system of claim 9, wherein the advertisement is proposed for publication within a social networking system.

11. The system of claim 9,
the fraud assessment value indicates a probability that the advertisement is fraudulent.

12. The system of claim 9, wherein the predetermined subject matter includes luxury goods.

13. A non-transitory computer-readable storage medium including instructions that, when executed by at least one processor of a computing system, cause the computing system to perform a method comprising:
receiving an advertisement including an image;
training a machine learning model as a fraud classifier;
applying the fraud classifier to the advertisement to generate a fraud assessment value for the advertisement;
training a machine learning model as an image classifier;
applying the image classifier to the image to generate an image assessment value for the image indicating a probability that the image reflects predetermined subject matter associated with fraudulent advertisements;
comparing the fraud assessment value and a threshold value for fraud assessment;
comparing the image assessment value and a threshold value for image assessment; and
determining fraud associated with the advertisement based on the comparing the fraud assessment value and the comparing the image assessment value, wherein the determining fraud comprises:
determining whether the fraud assessment value satisfies the threshold value for fraud assessment, and
determining whether the image assessment value satisfies the threshold value for image assessment.

14. The non-transitory computer-readable storage medium of claim 13, wherein the advertisement is proposed for publication within a social networking system.

15. The non-transitory computer-readable storage medium of claim 13, wherein
the fraud assessment value indicates a probability that the advertisement is fraudulent.

16. The non-transitory computer-readable storage medium of claim 13, wherein the predetermined subject matter includes luxury goods.

* * * * *